(No Model.)
I. R. & L. L. FUNK.
HYDRAULIC AIR COMPRESSOR.
No. 417,717. Patented Dec. 24, 1889.
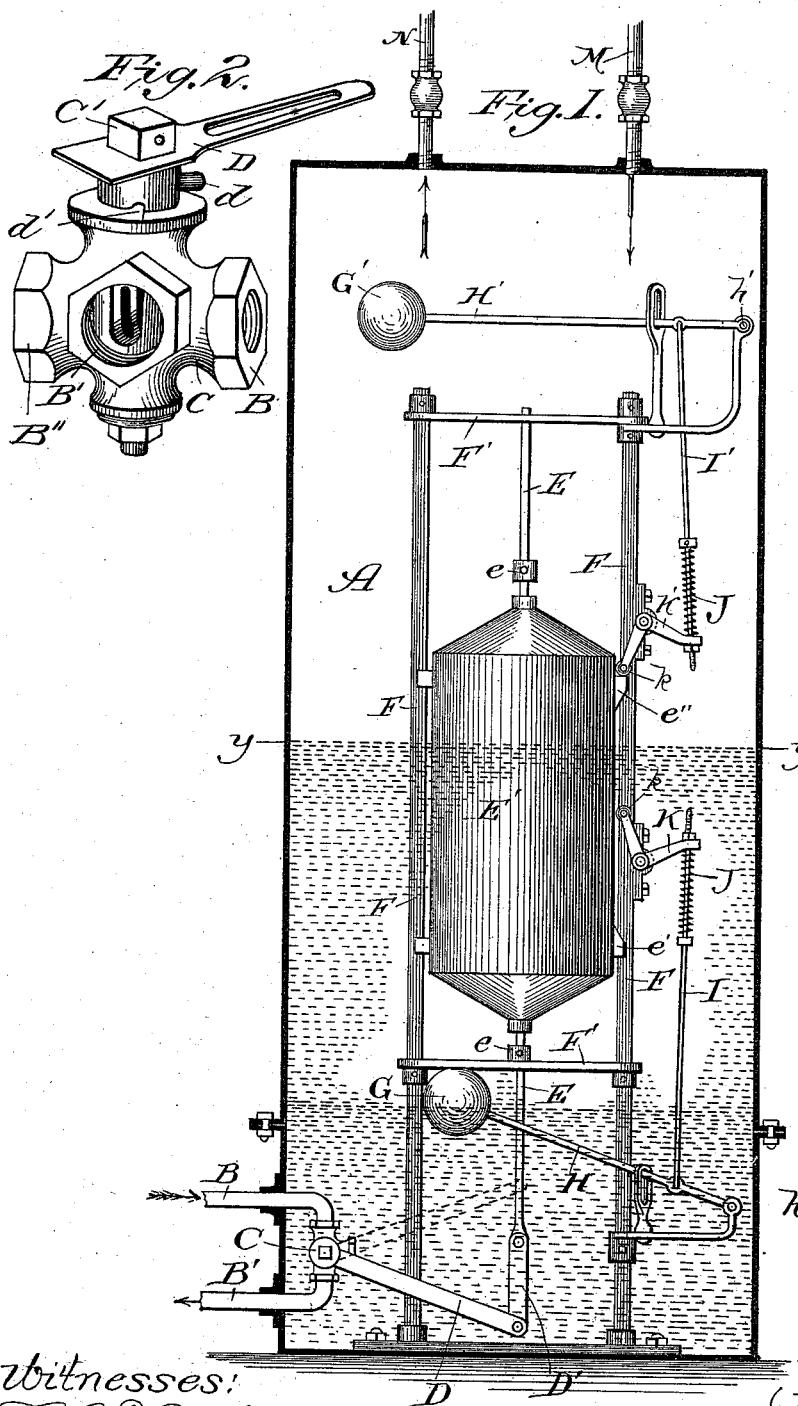
Witnesses:
Chas. E. Gaylord.
F. L. Brown.
Inventors:
Isaac R. Funk,
Levi L. Funk,
By Charles T. Brown,
Atty.

UNITED STATES PATENT OFFICE.

ISAAC R. FUNK AND LEVI L. FUNK, OF CHICAGO, ILLINOIS.

HYDRAULIC AIR-COMPRESSOR.

SPECIFICATION forming part of Letters Patent No. 417,717, dated December 24, 1889.

Application filed July 16, 1888. Serial No. 280,070. (No model.)

*To all whom it may concern:*

Be it known that we, ISAAC R. FUNK and LEVI L. FUNK, citizens of the United States, residing at Chicago, in the county of Cook and State of Illinois, have invented certain new and useful Improvements in Automatic Hydraulic Air-Compressors, of which the following is a full and complete description.

The purpose of our invention is to obtain an automatic hydraulic air-compressor by which air may be compressed any given or desired amount by attaching to our device a pipe having a suitable stop-cock therein connecting with water having the proper head to give the desired pressure to the water running into and actuating our device and to the air compressed thereby.

The herein-described invention made by us is adapted to perform the functions in many instances and to take the place of an ordinary air-compressing pump; but the construction of our invention is such that no piston or other movable parts requiring packing or other protection against the leakage of the air compressed thereby is necessary.

In the drawings accompanying this specification, and forming a part hereof, we have shown in cross-section a closed vessel or receptacle adapted to act as an automatic hydraulic air-compressor when taken in combination with the devices placed therein by us and hereinafter fully described. This closed vessel has an air-inlet and an air-outlet, as also a water-inlet and a water-outlet, each of which said inlets and outlets is controlled by a suitable valve or stop-cock. When desired, two or more of such closed vessels or automatic hydraulic air-compressors may be connected together in such manner as to operate as a gang, discharging the air compressed thereby into a common receiver, from which said compressed air may be taken for use.

It is evident that when water is allowed to enter a closed vessel having air therein, if the height of the water be such as to give a pressure of any amount—as, say, thirty pounds to the square inch to the water entering such closed vessel—the said air so contained in said vessel will be compressed thereby until it exerts a like pressure of thirty pounds per square inch, and that at such time no other or more water can enter said closed vessel. It is also evident to one skilled in the art that if such compressed air, or a portion thereof, be withdrawn from said closed vessel an additional amount of water may and will enter therein, and that thereby a constant pressure will be continuously exerted upon and by said compressed air.

Our invention consists in the several herein-described devices whereby, when all, or nearly all, of the compressed air contained in said closed vessel shall have been withdrawn therefrom, the flow of water or other liquid into said vessel by which said air has been so compressed shall be automatically stopped, and an outlet for said water or other liquid from said vessel automatically made, and the same thereby relieved of its liquid contents.

Our invention further consists in devices whereby when the said closed vessel shall have been relieved, or nearly so, of the water contained therein the said outlet shall be automatically closed and water again automatically admitted into said closed vessel, again compressing the air contained therein and admitted thereinto upon the running out of the water or other liquid hereinbefore referred to.

Figure 1 is a vertical cross-section of our invention. Fig. 2 is a perspective view of a three-way cock which may be used at the point indicated in Fig. 1.

Like letters refer to like parts throughout the several views.

A is a closed vessel or air and water tight receptacle.

B is a water-inlet into receptacle A, and B' is a water-outlet therefrom.

B'' is that part of three-way cock C through which water passes from inlet B into the closed receptacle, and also through which water passes from the closed receptacle into outlet B' in running therefrom.

$b\ b'$ and $b\ b'''$ are holes in the shell of three-way cock C, communicating with inlet B, outlet B', and the closed receptacle A, through B'' respectively.

$c''$ and $c'''$ are holes in plug C' of the three-way cock, and form a continuous water-way through plug C'.

$d$ is a stop on plug C'. Holes $c''$ and $c'''$, communicating with each other and passing through the plug C', are placed into said plug nearly at right angles with each other, and in such reference with stop $d$ on said plug that when hole $c''$ is opposite outlet-hole $b'$ said stop $d$ is against stop $d'$ on the shell of said three-way cock C, and at the same time hole $c'''$ is opposite $b''$, opening into the closed receptacle. When stop $d$ is turned against stop $d''$, hole $c''$ is opposite hole $b''$ and hole $c'''$ is opposite hole $b$. There is thus formed alternately communication between holes $b$ and $b''$ and $b''$ and $b'$, through plug C', as said plug is turned by lever D, hereinafter described.

Where a three-way cock constructed as illustrated in Fig. 3 is employed, there is formed a straight water-way through the shell of the three-way cock and the plug C' thereof, by holes $c''$ and $c'''$, from inlet B to the closed receptacle through B''. In this form of construction, as well as in the three-way cock illustrated in Fig. 2, one quarter-turn of plug C' will alternately make an open water-way through said three-way cock from the inlet to the closed receptacle, and from said closed receptacle through said cock to the outlet B'.

M is an air-inlet into receptacle A, closed against air escaping therefrom by an ordinary check-valve, and N is an air-outlet from said receptacle A, closed against air entering thereinto through said outlet by an ordinary check-valve, but allowing air to freely pass out therefrom.

C is a three-way water-cock actuated by lever D.

D' is a rod connecting lever D with rod E.

E' is a water-float secured in position on rod E by stops $e\ e$, so that any upward or downward movement of water-float E' on vertical guides F F will cause like movement in rod E in guides or cross-bars F', thereby actuating lever D and three-way cock C. Three-way cock C is so connected with water-float E' by the several rods and levers E, D', and D that when said water-float E' is in the lowest position it is permitted to assume on vertical guides F F, water may enter through the said three-way cock C and inlet-pipe B into closed vessel A; and when the said water-float E' is in the highest position it is allowed to assume, three-way cock C is in such position that water cannot enter closed vessel A through said cock, and at the same time the said cock is in such position that the water already contained in said vessel may pass through said cock and from said vessel. It is evident that rod E may, if preferred, be made to actuate in its upward and downward movement two separate valves, one of which said water cocks or valves will be opened when the float E' is in one position, the other of said cocks or valves being closed thereby, and when said water-float E' is in the other position the position of said cocks or valves will be reversed, and if water be allowed to enter said receptacle or vessel through one of said cocks or valves and run from said receptacle through the other of said cocks or valves the alternate rising and falling of the said water-float E' will cause the said receptacle to be alternately filled and emptied by the water running in and out thereof, provided the said water-float E' be so controlled in its rising and falling that the gradual rise of water in the said closed receptacle or the gradual fall of the water therein does not produce a like gradual rise or fall in the said water-float E'; but, on the contrary, the said water-float E' retains its position either up or down until the water shall completely fill, or nearly so, or completely run from, or nearly so, the said closed receptacle A; and to accomplish such result the following herein-described devices are employed. We do not confine ourselves, however, to devices of the exact construction as those herein described, as other devices actuated in like manner may be readily made to accomplish like results.

$e'\ e''$ are stops on water-float E'.

F F are vertical guides on which water-float E' moves vertically.

G G' are water-floats placed, respectively, at one end of levers H H'.

Lever H is pivoted on fulcrum $h$ and lever H' is pivoted on fulcrum $h'$.

I I' are rods secured at one end to levers H H', and at the other end secured to trip-stop or trigger K K', respectively.

J J are springs, one end of each of which rests against a shoulder on rods I I', respectively, the other end thereof pressing against one arm of trigger K K'. By the intervention of the springs J J tension in rods I I' tends directly to cause movement in triggers K K', while any movement in said triggers need not be communicated to said rods I I' and floats G G', but may instead thereof compress said springs.

$k\ k$ are friction-pulleys, placed one at the end of one of the arms of each of the triggers K K'.

Y Y represent the water-line in reservoir A when the several parts of the device are in the position illustrated in the drawings; and in the drawings the water is represented as flowing into receptacle A, said water having a tendency to raise water-float E'. The stop $e''$ on said float is thereby brought into contact with friction-roller $k$ in trigger K'. The said float E' cannot, therefore, be raised by any further inflow of water into said receptacle A until said trigger K' shall be released from contact with said stop $e''$. The releasing of said trigger K' from said stop $e''$ is accomplished by the raising of float G' by the water in receptacle A, when the said water shall have attained a sufficient height in said receptacle. When float G' is thus raised by the water filling or nearly filling receptacle A, the trigger K' is withdrawn from contact with stop $e''$ on water-float E', and the said water-float will therefore rapidly rise into the highest position in said guides F F, and rod E being raised thereby the inflow of water through three-way cock C is stopped and the said three-way cock C so turned that the water contained in said receptacle A will flow therefrom through said three-way cock C and through outlet B', thereby emptying said receptacle of the water therein. It will be observed that when the water in the receptacle A has covered the float G therein said float G will assume the position, or nearly so, illustrated in the drawings, and that trigger K will be thereby pressed against water-float E' by a force or tension corresponding with the tension exerted by spring J on rod I. When trigger K is in this position and pressing against water-float E', if the said water-float be in the elevated position last described, the said trigger K will be underneath stop e' and in such position that any tendency of said water-float E' to drop or lower will be checked and entirely stopped by said trigger K. As the water contained in receptacle A flows therefrom, owing to the position of three-way cock C by the elevation of said water-float E', there is a tendency in said float E' to drop or lower with the receding water in said vessel. This tendency is, however, checked and stopped, as is described, by trigger K. When the water in the said receptacle has so far receded therefrom that float G may drop into the lowest position provided therefor, trigger K, through such dropping of float G, will be withdrawn from contact with stop e', and water-float E' being thereby released from its elevated position it will suddenly drop and assume the position, or nearly so, indicated in the drawings, and water will again enter three-way cock C and inlet-pipe B. As the water is entering into receptacle A, thereby compressing the air therein, escape of said air from said receptacle through air-inlet M is prevented by a suitable check-valve placed therein; but air may at any time be withdrawn from said receptacle A, either for use or for storage in a suitable reservoir, through outlet N. As the water is escaping from said receptacle A through three-way cock C and outlet B', air may enter through inlet M and check-valve contained therein, while an inflow or return of air through pipe N is prevented by a suitable check-valve placed therein.

Having thus described our invention, its construction, and method of operation, what we claim, and desire to secure by Letters Patent, is—

1. In a hydraulic air-compressor consisting of a closed receptacle having a water inlet and outlet and an air inlet and outlet, the combination of a valve contained within the receptacle and controlling the flow of water into and from the receptacle through the water inlet and outlet, with a float adapted to move vertically contained within the receptacle and attached to and actuating the water-valve, triggers contained within the receptacle and adapted to hold the float attached to the water-valve in the upper and lower of the positions it may assume, a float adapted to move vertically contained within the receptacle near the top thereof and attached to and actuating the trigger holding the float attached to the water-valve in its lower position, and a float adapted to move vertically contained within the receptacle near the bottom thereof and attached to and actuating the trigger holding the float attached to the water-valve in its upper position, substantially as described.

2. In an automatic hydraulic air-compressor, a closed receptacle having an air inlet and outlet, a water inlet and outlet, and valve contained within the receptacle and controlling the flow of water into and from the receptacle through the water inlet and outlet, in combination with floats contained within the closed receptacle and adapted to move vertically therein, one of the floats attached to and actuating the water-valve, triggers also contained within the closed receptacle and adapted to hold the float attached to the water-valve in the upper and lower of the positions it may assume, and the others of the floats respectively attached to and actuating the triggers named, substantially as described.

ISAAC R. FUNK.
LEVI L. FUNK.

Witnesses:
CHARLES T. BROWN,
F. L. BROWN.